Patented Feb. 29, 1944

2,342,624

UNITED STATES PATENT OFFICE 2,342,624

PROCESS FOR WATERPROOFING AND
PRODUCT PRODUCED THEREBY

David Aelony, Dayton, Ohio, assignor to Monsanto Chemical Company, a corporation of Delaware No Drawing. Application September 8, 1941,
Serial No. 410,048

7 Claims. (Cl. 252—8.8)

This invention relates to a process for waterproofing fibrous bodies employing N,N'-diacyl derivatives of arylene or aralkylene di- or polyamines, and to products obtained thereby.

The present process employs compounds having the following general formula:

$$\begin{array}{c} RCONR'NOCR \\ | \quad | \\ H \quad H \end{array}$$

where R is a long chain aliphatic residue having a carbon chain length from $C_8$ to $C_{28}$, inclusive, and R' is an aromatic residue, particularly an arylene or aralkylene residue, such as phenylene, biphenylene, naphthylene, anthrylene, methylphenylene or phenanthrylene.

I have found that compounds of the general formula as given above are characterized by having pronounced hydrophobic properties. These compounds are also highly insoluble in water and in most organic solvents including chlorinated organic solvents as are used in dry cleaning, etc.

They are also characterized by the property of readily forming dispersions in water solution which dispersions may be produced either mechanically or by combinations of mechanical and chemical processes, including the use of dispersing agents. I have found that these dispersions may be employed to treat fibrous products for the purpose of developing water repellent properties.

Compounds of the above general formula are obtainable by treating arylene or aralkylene di- or poly-amines with acyl halides containing 8 or more carbon atoms. As arylene or aralkylene amines, there may be used o, m, or p-phenylenediamine, benzidine, 4,4'-diaminodiphenylmethane, 4,4'-diaminodiphenylamine, toluylenediamines, naphthylenediamines, diaminoanthracenes, diaminophenanthrenes, etc. As acyl halides there may be used pure stearoyl chloride, pure palmitoyl chloride, or pure lauroyl chloride. There may also be used acyl halides prepared in known manner from commercial acid mixtures such as commercial stearic acid, commercial palm oil fatty acid, or commercial coconut oil fatty acid, and from other commercial acids derived from natural or synthetic products such as the natural oils, fats, or waxes, or oxidation products of higher aliphatic hydrocarbons.

As N,N'-diacyl derivatives of arylene or aralkylene di- or polyamines there may be mentioned, for instance, N,N'-distearoylbenzidine of the following constitution:

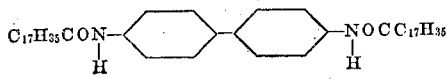

and N,N'-dipalmitoyl-p-phenylenediamine of the following constitution:

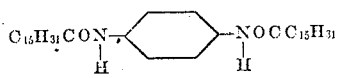

furthermore, N,N'-distearoyl-4,4'-diaminodiphenylmethane, N,N'-dilauroyl-vic-m-toluylenediamine, N,N'-dipalmitoyl-1,2-diaminonaphthalene, N,N'-distearoyl-1,4-diaminoanthracene, N,N'-distearoyl-9,10-diaminophenanthrene, etc., and corresponding compounds obtainable by the use of acyl halides prepared from commercial acids derived from natural or synthetic products such as the natural oils, fats or waxes, or oxidation products of higher aliphatic hydrocarbons.

The following example will illustrate the preparation of an N,N'-diacyl derivative of an arylene or aralkylene di- or polyamine. For the preparation of N,N'-distearoylbenzidine I convert 45 grams of stearic acid into the acid chloride by heating it at 40–50° C. with 25 cc. of thionyl chloride. The excess of thionyl chloride is distilled and 300 cc. of benzene is added to the residue, which is subsequently treated with a solution of 11 grams of benzidine in 200 cc. of benzene. The precipitate thus obtained is filtered, washed with alcohol, and dried. There is obtained 26.5 grams of a brownish amorphous material, melting at 226° C.–232° C.

The herein described compounds are especially valuable for application to the various textile fibers or fibrous products, namely, fabrics woven from cotton, linen, wool, jute, artificial silk, yarns and the like for the purpose of producing waterproof products. These compounds may also be applied to paper forming fibers such as sulfate, sulfite and ground wood pulp, or to paper, itself. The application to such paper forming fibers is preferably done in the beater or Jordan machine wherein the herein described alkylene diamide is dispersed mechanically or by combinations of mechanical and chemical dispersing agents.

Since the N,N'-diacyl derivatives of arylene or aralkylene amines herein described are water insoluble powders of pronounced hydrophobic properties, it is preferred for the application of these substances to fibrous products for the purpose of developing water repellency, to first prepare aqueous dispersions by very intimately comminuting the product in the presence of water or other dispersing media. While such dispersions can be prepared mechanically, their preparation is somewhat easier if the alkylene diamide is dispersed in the presence of chemical dispersing agents. Such chemical dispersing agents suitable for preparation of dispersions of the present compounds are the following: copolymers of styrene and maleic anhydride, which copolymers have been converted to their water soluble salts, i. e., sodium or ammonium salts, organic amine or ammonium salts of alkyl aryl phosphinic acids, glyceryl, sulforicinoleate, butyl hydroxydiphenylsulfonate or N-(p-sodium sulfophenyliminomethylene) stearamide.

This invention is illustrated but not limited by the following example:

Example

A dispersion of 4 grams of N,N'-distearoylbenzidine having a melting point in the neighborhood of 229° C., 2 grams of water soluble salt such as the ammonium salt of the styrene maleic anhydride copolymer in 400 grams of water is prepared in a mechanical dispersing apparatus. A sample of Indian Head cloth is treated in the suspension contained in a padding machine, while the temperature of the dispersion is in the neighborhood of 45° C. The treated cloth is wrung out and then dried by heating it to a temperature of 235° C., i. e., above the melting point of the diamide. The treated cloth will be found to have a permanent wash resistant, water-repellent property and a good feel.

Fabrics treated by the herein described process may be evaluated as to water repellency by two tests generally applied by those skilled in the art. These tests are known as the "spray test" and as the "hydrostatic head test." The spray test which I employ is described in the American Dyestuffs Reporter, vol. 28, page 285 for 1939. The hydrostatic head test is described in the 1940 Yearbook of the American Association of Textile Chemists and Colorists at pages 223–4.

A sample of Indian Head cloth treated as above described with N,N'-distearoylbenzidine showed the following degree of water-proofness. Tested with the spray test above referred to, I obtained a moisture absorption of 36.9% and a hydrostatic head value of 14.4 cm. I then subjected my treated fabric to 20 consecutive washings with soap and warm water and thereafter I obtained a spray test value of 65.6% moisture absorption and a hydrostatic head value of 8.5 cm., which values indicate good wash resistance. The arylene diamide may also be applied to textile products either woven or knitted from the synthetic linear condensation polyamide yarns, such as the polyhexamethylene adipamide, for the purpose of increasing the water repellent properties thereof. Or it may be dispersed in the polymer or in solutions of the polymer prior to the spinning of such materials. Likewise, the present compounds may be incorporated into a synthetic textile fiber forming derivative such as cellulose acetate, nitrate, viscose, and in each case improved water resistance may thereby be obtained.

The present compounds are of pronounced heat stability and I may accordingly make dispersions thereof by melting such compounds and then dispersing the molten compound in water, in the presence of dispersing agents, by the use of high speed agitators, homogenizers, etc.

While relatively dilute solutions of the dispersions, say from 0.2% to 1% or even 4% or 5% may be employed for the application of the diamide to the cloth, even more concentrated dispersions, say up to 40% or 50% may be advantageously prepared, especially with the aid of chemical dispersing agents, and the concentrated dispersions may then be diluted to a satisfactory usable dilution prior to application to textile fabrics. In general, suitable treating solution may contain an amount of dispersing agent ranging from 1% to 10% or more by weight of the diamide. Such aqueous dispersions may conveniently be marketed directly as dispersions either in concentrated form or in dilute form ready for application to textiles. It is also possible to market the dry powdered diamide as such either in the pure form or having mixed therewith any of the dispersion agents above mentioned in dry form or the dry powdered diamide may, prior to drying, be treated with solutions of the dispersing agent and then dried to obtain a dry powder of the diamide upon the particles of which is coated the dispersing agent.

What I claim is:

1. The process of imparting water repellent properties to fibrous products comprising treating said fibrous products with a compound of the formula:

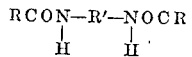

where R is a long chain aliphatic residue having a carbon chain of from $C_8$ to $C_{28}$ inclusive, and R' is an aromatic residue.

2. The process of imparting water repellent properties to fibrous products, comprising forming a disperse phase comprising the compound:

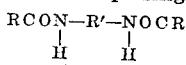

where R is a long chain aliphatic residue having a carbon chain length of from $C_8$ to $C_{28}$ inclusive, and R' is an aromatic residue, in a dispersing medium and then treating fibrous products therewith.

3. The process defined in claim 2, in which R is the stearyl residue and R' is the biphenylene residue.

4. Fibrous products associated with a hydrophobic body of the formula:

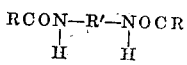

where R is a long chain aliphatic residue having a carbon chain length of from $C_8$ to $C_{28}$ inclusive, and R' is an aromatic residue.

5. The product defined in claim 4 in which the aromatic residue R' is selected from the class consisting of phenyl, biphenyl, naphthyl, anthryl and phenanthryl.

6. The process of imparting water repellent properties to fibrous products comprising forming a disperse phase comprising the compound:

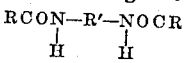

where R is a long chain aliphatic residue having a carbon chain length of from $C_8$ to $C_{28}$ inclusive, and R' is an aromatic residue, in a dispersing medium containing a dispersing agent, and treating fibrous products therewith.

7. A textile treating composition comprising an aqueous dispersion of:

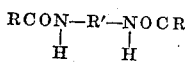

where R is a long chain aliphatic residue having a carbon chain length of from $C_8$ to $C_{28}$ inclusive, and R' is an aromatic residue.

DAVID AELONY.